US011185980B2

United States Patent
Huang et al.

(10) Patent No.: US 11,185,980 B2
(45) Date of Patent: Nov. 30, 2021

(54) MACHINE LEARNING-BASED SYSTEMS AND METHODS FOR CONTROLLING ROBOTIC OBJECT PICKING AND PLACEMENT IN TRAINING AND RUN TIME ENVIRONMENTS

(71) Applicant: ABB Schweiz AG, Baden (CH)

(72) Inventors: Jinmiao Huang, Chongqing (CN); Carlos Martinez, South Windsor, CT (US); Sangeun Choi, Simsbury, CT (US)

(73) Assignee: ABB Schweiz AG, Baden (CH)

( * ) Notice: Subject to any disclaimer, the term of this patent is extended or adjusted under 35 U.S.C. 154(b) by 288 days.

(21) Appl. No.: 16/385,470

(22) Filed: Apr. 16, 2019

(65) Prior Publication Data

US 2020/0331144 A1    Oct. 22, 2020

(51) Int. Cl.
 *B25J 9/16* (2006.01)

(52) U.S. Cl.
 CPC ............ *B25J 9/163* (2013.01); *B25J 9/1664* (2013.01); *B25J 9/1679* (2013.01); *B25J 9/1697* (2013.01); *G05B 2219/50391* (2013.01)

(58) Field of Classification Search
 CPC combination set(s) only.
 See application file for complete search history.

(56) References Cited

U.S. PATENT DOCUMENTS

| 10,089,575 B1 * | 10/2018 | Redmon | G06N 3/049 |
| 10,131,051 B1 * | 11/2018 | Goyal | B25J 9/1697 |
| 2017/0028562 A1 * | 2/2017 | Yamazaki | B25J 9/1697 |
| 2018/0036774 A1 * | 2/2018 | Lukka | B07C 5/3422 |

OTHER PUBLICATIONS

Levine et al., "Learning Hand-Eye Coordination for Robotic Grasping with Deep Learning and Large-Scale Data Collection," *arXiv preprint arXiv:1603.02199*, 12 pp. (2016).

Mahler et al., "Dex-Net 2.0: Deep Learning to Plan Robust Grasps with Synthetic Point Clouds and Analytic Grasp Metrics," *arXiv preprint arXiv:1703.09312*, 12 pp. (2017).

(Continued)

*Primary Examiner* — Kyle O Logan
(74) *Attorney, Agent, or Firm* — Leydig, Voit & Mayer, Ltd.

(57) ABSTRACT

Methods, systems, and software for controlling object picking and placement by a robot system are disclosed. The method includes assigning machine learning training data of a machine learning model for an object. The machine learning training data includes a plurality of known grasp location labels assigned to the object positioned in a plurality of different object poses. The method includes providing the object in a work space of the robot system. For the object in the work space in a first pose of the plurality of different object poses, the method includes: mapping a first candidate grasp location on the object; executing robotic movements for the first candidate grasp location on the object; and evaluating a result of the executing for the first candidate grasp location according to at least one predetermined performance criteria.

20 Claims, 11 Drawing Sheets

(56) References Cited

OTHER PUBLICATIONS

Pinto et al., "Supersizing Self-supervision: Learning to Grasp from 50K Tries and 700 Robot Hours," *2016 IEEE International Conference on Robotics and Automation (ICRA)*, IEEE, 8 pp. (2016).
Preferred Networks, Inc., "Bin-picking Robot Deep Learning," YouTube video downloaded from the Internet at https://www.youtube.com/watch?v=ydh_AdWZflA on Dec. 26, 2018, 2 pp. (Dec. 15, 2015).
Redmon et al., "Real-Time Grasp Detection Using Convolutional Neural Networks," Robotics and Automation (ICRA), *2015 IEEE International Conference (ICRA)*, IEEE, 7 pp. (2015).
European Patent Office, International Search Report in International Patent Application No. PCT/IB2020/053557, 5 pp. (dated Aug. 7, 2020).
European Patent Office, Written Opinion in International Patent Application No. PCT/IB2020/053557, 8 pp. (dated Aug. 7, 2020).

\* cited by examiner

MACHINE LEARNING-BASED SYSTEMS AND METHODS FOR CONTROLLING ROBOTIC OBJECT PICKING AND PLACEMENT IN TRAINING AND RUN TIME ENVIRONMENTS

TECHNICAL FIELD

The present disclosure relates to robotic grasping of objects, and, more particularly, to systems and methods for machine learning-based grasping of objects by robotic arms.

BACKGROUND

In at least some known methods, two-dimensional (2D) or three-dimensional (3D) models are fit to objects to be grasped by robots. Alternatively, in such known systems and methods, analytical reasoning is used to calculate the grasp locations on objects. Drawbacks of such known systems and methods includes time- and computing resource-intensive requirements for 3D modeling and the fact that effectiveness of model application in practical run time environments depends on robot system efficiency. Additionally, such geometry-based approaches ignore densities and mass distributions of objects in predicting grasp locations. Furthermore, object model-based virtual simulation training systems and methods are prone to over-fitting, which increases grasp failure rates. Moreover, in known systems and methods, using human-labeled object image data sets is both challenging and impractically time-consuming, and difficult to scale-up for industrially relevant unit operations.

SUMMARY

The machine learning-based systems, methods, and software for controlling object picking and placement by robot systems disclosed herein present a new and improved processing pipeline for solving robot picking problems. There are four components in this pipeline. Firstly, a machine learning-orientated database is used to save a function to map object image(s) to grasp location(s). Such mapping is object location- and object orientation-invariant. Therefore, there is no need to estimate the object pose in the work space. Secondly, a hybrid machine learning engine is used to train the robot to learn the grasp location in both simulated and real-world environments. Thirdly, a sensor feedback system that fuses multiple sensor signals is utilized to evaluate the grasp quality. Lastly, the disclosed systems and methods are capable of run time/in-line self-correction and fine-tuning the grasp during runtime by online learning.

In one aspect, the disclosure describes a method for controlling object picking and placement by a robot system. The robot system includes: a processor in communication with a memory device, a robotic arm in communication with the processor, and an object gripper device operably coupled to the robotic arm and in communication with the processor. The method includes assigning and storing in the memory device, by the processor, machine learning training data of a machine learning model for an object. The machine learning training data includes a plurality of known grasp location labels assigned to the object positioned in a plurality of different object poses. The method includes providing the object in a work space of the robot system. For the object in the work space in a first pose of the plurality of different object poses, the method includes: mapping, by the processor, a first candidate grasp location on the object; executing, by the robotic arm and the object gripper device, robotic movements for the first candidate grasp location on the object; and evaluating, by the processor, a result of the executing for the first candidate grasp location according to at least one predetermined performance criteria.

In another aspect, the disclosure describes a system for controlling object picking and placement by a robot. The system includes at least one object gripper device and at least one robotic arm operably coupled to the at least one object gripper device. The system includes at least one memory device and at least one processor in communication with the at least one memory device. The at least one processor is programmed to assign machine learning training data of a machine learning model for an object. The machine learning training data includes a plurality of known grasp location labels assigned to the object positioned in a plurality of different object pose. For the object positioned in a work space of the robot in a first pose of the plurality of different object poses, the at least one processor is programmed to: map a first candidate grasp location on the object; execute robotic movements by the at least one robotic arm and the at least one object gripper device for the first candidate grasp location on the object; and evaluate a result of the executing for the first candidate grasp location according to at least one predetermined performance criteria stored in the at least one memory device.

In yet another aspect, the disclosure describes a non-transient computer-readable medium. The non-transient computer-readable medium stores as software processor-executable instructions for controlling object picking and placement by a robot system. When executed by one or more processors in communication with one or more memory devices, the processor-executable instructions cause the one or more processors to assign machine learning training data of a machine learning model for an object. The machine learning training data includes a plurality of known grasp location labels assigned to the object positioned in a plurality of different object poses. When executed by one or more processors, for the object positioned in a work space of the robot system in a first pose of the plurality of different object poses, the processor-executable instructions cause the one or more processors to: map a candidate grasp location on the object; execute robotic movements by at least one robotic arm and at least one object gripper device of the robot system for the candidate grasp location on the object; and evaluate a result of the executing for the candidate grasp location according to at least one predetermined performance criteria.

The machine learning-based systems, methods, and software for controlling object picking and placement by robot systems disclosed herein provide users a number of beneficial technical effects and realize various advantages as compared to known systems and methods. Such benefits include, without limitation, enabling picking and placing of object(s) in the absence of pose estimation, and with the same or better accuracy, speed, efficiency, and error rate as compared to known processes. Utilizing the disclosed systems and methods for controlling object picking and placement by robot systems thereby results in a reduction in the required number of per object CPU clock cycles needed for processor(s), as compared to known systems and methods. As such, the disclosed systems and methods for controlling object picking and placement by robot systems enable picking and placing of object(s) with improved utilization of computing, memory, network, electric power, and/or human personnel resources as compared to known processes. These and other substantial and numerous technical benefits and advantageous effects appreciable to persons of ordinary skill in the art are especially evident as compared to known systems and methods in applications involving high volume and high tempo industrial operations.

For practical applications including controlling object picking and placement by robot systems, these improvements over known systems and methods are not accomplished by merely utilizing conventional and routine processing systems and methods. Even in cases where such improvements may be quantified in terms of per object time reductions (e.g., measured as seconds, or fractions thereof), over relevant time periods (e.g., from hours to years) and as compared to known systems and methods, the disclosed machine learning-based systems, methods, and software for controlling object picking and placement by robot systems utilize computing, network, memory, electric power, personnel, among other, resources at significantly greater efficiencies to provide improved throughput of, and overall cost reduction for, a variety of industrial unit operations involving robotic picking and placement of objects.

Further and alternative aspects and features of the disclosed principles will be appreciated from the following detailed description and the accompanying drawings. As will be appreciated, the principles related to the disclosed systems and methods for machine learning-based grasping of objects by robotic arms are capable of being carried out in other and different embodiments, and capable of being modified in various respects. Accordingly, it is to be understood that both the foregoing summary and the following detailed description are exemplary and explanatory only and do not restrict the scope of the appended claims.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
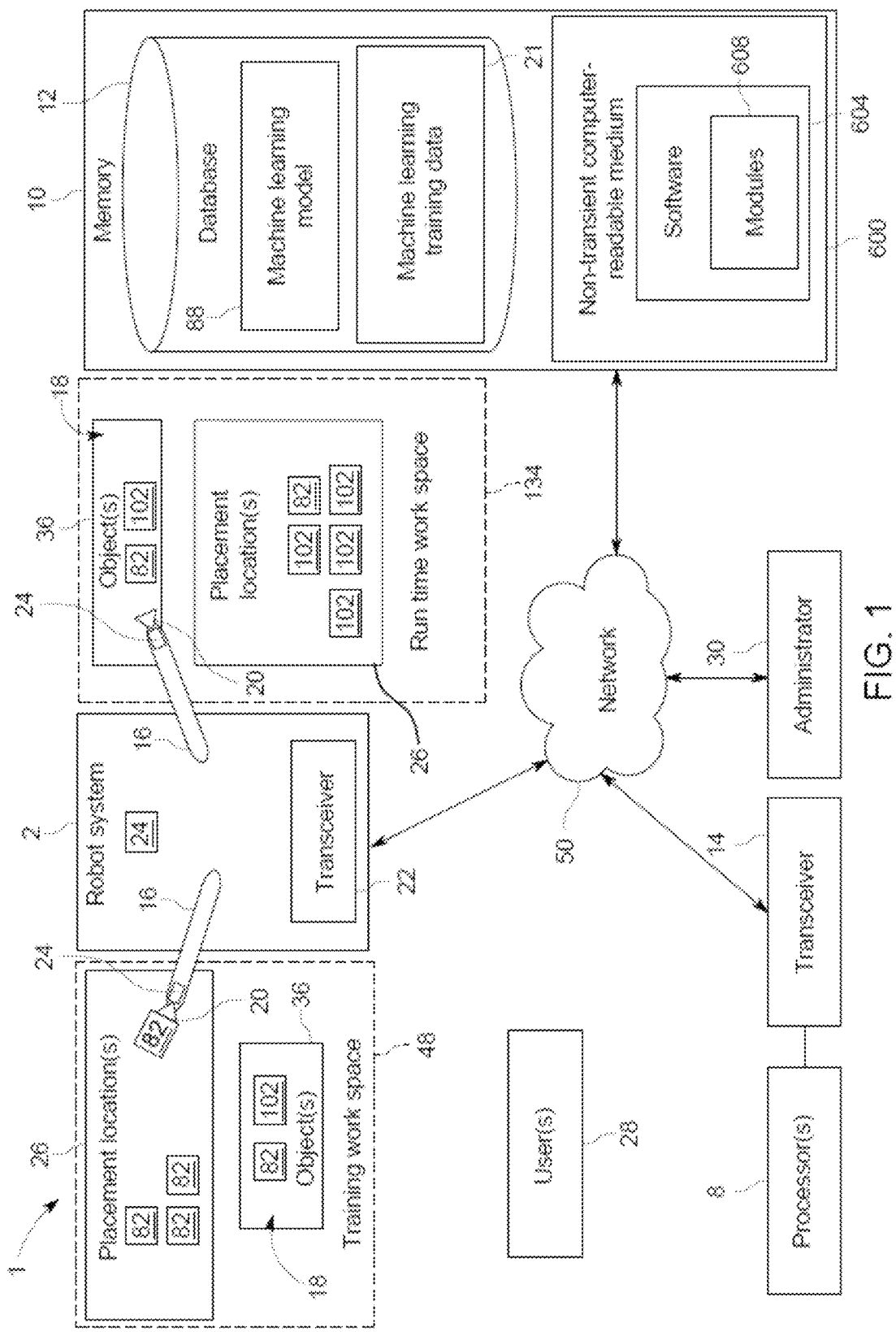
FIG. 1 is a schematic diagram of a system for controlling object picking and placing by a robotic system according to an embodiment of the disclosure.
Figure 2:
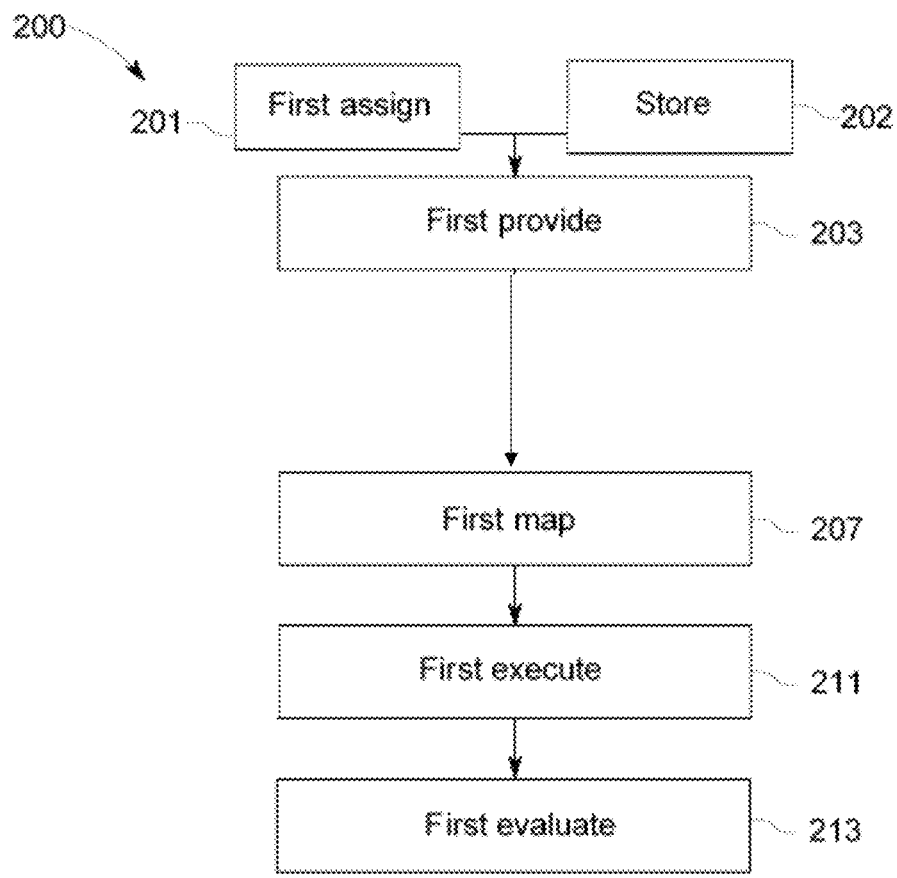
FIG. 2 is a flow chart of a method for controlling object picking and placing by the robotic system shown in FIG. 1 according to an embodiment of the disclosure.

FIG. 1 is a schematic diagram of a system (1) for controlling object picking and placement by a robot system (2) according to an embodiment of the disclosure. FIG. 2 is a flow chart of a method (200) for controlling object picking and placement by the robot system (2) shown in FIG. 1 according to an embodiment of the disclosure. In the illustrated examples, the method (200) shown in FIG. 2 is implemented, at least in part, using the system (1) of FIG. 1.

Referring to FIG. 1, system (1) includes one or more memory devices (10), also collectively referred to herein as memory (10). In an example, memory (10) includes a database (12) stored therein. System (1) includes one or more processors (8) in communication with memory (10). System (1) includes a robot system (2). Robot system (2) includes at least one robotic arm (16) in communication with processor(s) (8). System (1) includes at least one transceiver (14) coupled to processor(s) (8) and/or memory (10). Transceiver(s) (14) are coupled in communication with one or more transceivers (22) of robot system (2). In an example, memory (10) is also in communication with robot system (2). Robot system (2) includes at least one object gripper device (20) operably coupled to robotic arm(s) (16). Object gripper device(s) (20) (also referred to herein simply as "gripper (20)") is/are in communication with processor(s) (8).

System (1) includes one or more sensors (24) in communication with processor(s) (8). In an example, sensor(s) (24) is/are positioned on and/or in robotic arm(s) (16) and/or gripper(s) (20) and are operably coupled thereto. Sensor(s) (24) include one or more of: multi-degree of freedom (DOF) force-torque sensor(s), camera(s) for monitoring and collecting visual data during robotic object (36) manipulation tasks such as grasping, multi-DOF inertial measurement sensor(s) for measuring dynamic aspects of robotic object (36) handling, and directional and/or rotational motion sensor(s) (e.g., motor encoder(s), camera(s), and/or tactile sensor(s)) for monitoring and/or detecting relative motion between the object (36) and the robot gripper (e.g., gripper(s) (20)). In an example, multi-DOF force-torque sensor(s) and/or multi-DOF inertial measurement sensor(s) are mounted and/or otherwise operably coupled to and/or between the robotic arm(s) (16) and the gripper(s) (20) for measuring a static and/or dynamic status of object(s) (36) with respect to the gripper(s) (20) and a grasp location on the object(s) (36).

System (1) includes a training work space (48) and a run time work space (134) for robot system (2). Training (48) and run time (134) work spaces include at least one picking location (18) and at least one placement location (26). One or more objects (36) are delivered to and/or otherwise arrive at picking location(s) (18) for manipulation by system (1) including robot system (2). In the embodiment shown in FIG. 1, a plurality of object(s) (36) (e.g., first (82) and second (102) objects) are present in training (48) and run time (150) work spaces, with each of the first (82) and the at least a second (102) objects having a plurality of physical characteristics (32) such as a shape, a weight, a density, a center of mass, a mass distribution, a height, a width, and/or a length. The plurality of object (36) physical characteristics include an object identification (40) and known images (37) depicting the appearance(s) of object(s) (36) in various poses.

Processor(s) (8) may be located in training (48) and/or run time (148) work space(s). Processor(s) (8) may be located remote from training (48) and/or run time (148) work space(s). Processor(s) (8) may be collocated with robot system (2). Processor(s) (8) are programmed to implement and/or otherwise perform, at least in part, one or more of the disclosed steps of a method (200) (shown in FIG. 2), including, without limitation, using system (1). Processor(s) (8) are capable of carrying out multiple functions in system (1). Processor(s) (8) include robotic arm (16) control functionality and gripper (20) control functionality. Processor(s) (8) include machine learning functionality. In an example, machine learning functionality of processor(s) (8) is implemented and/or otherwise performed, at least in part, in system (1) using artificial intelligence and/or deep learning scheme(s).

In an example, memory device(s) (10) store at least one non-transient computer-readable medium (600). Non-transient computer-readable medium (600) stores as software (604) processor (8)-executable instructions for controlling object (36) picking and placement by robot system (2). In an example, processor (8)-executable instructions stored as software (604) includes one or more software modules (608). When executed by the processor(s) (8) that are in communication with memory (10), robotic arm(s) (16), gripper(s) (20), and sensor (24), the processor (8)-executable instructions cause the processor(s) (8) to implement and/or otherwise perform, at least in part, one or more of the disclosed steps of method (200), including, without limitation, using system (1).

In system (1), processor(s) (8), memory (10), robotic arm(s) (16), gripper(s) (20), and sensor(s) (24) are in communication with one another via, and communicate with one another using signals (e.g., encoded data signals) sent and/or received through, a network (50). Communication among and between processor(s) (8), memory (10), robotic arm(s) (16), gripper(s) (20), and sensor(s) (24) is facilitated by transceivers (14, 22). In an example, system (1) communication using network (50) includes wireless communication equipment and protocols. In another example, system (1) communication using network (50) includes wired communication equipment and protocols. In yet another example, system (1) communication using network (50) includes a combination of wireless and wired communication equipment and protocols. In an example, system (1) communication includes wireless and/or wired communication equipment and protocols for utilizing cloud-based processing, storage, and/or communication resources. In an example, system (1) communication utilizes the Internet, including, without limitation, Internet of Things (IoT) protocols, practices, and/or standards.

Figure 3:
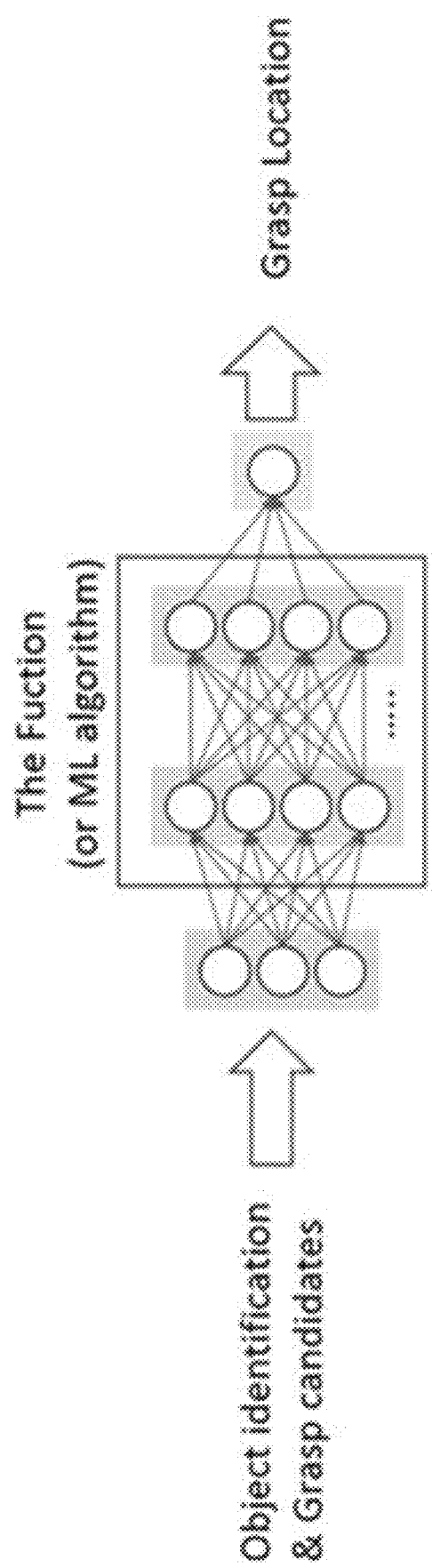
FIG. 3 is a schematic diagram of the method shown in FIG. 2 in an abbreviated representation according to an embodiment of the disclosure.
Figure 4:
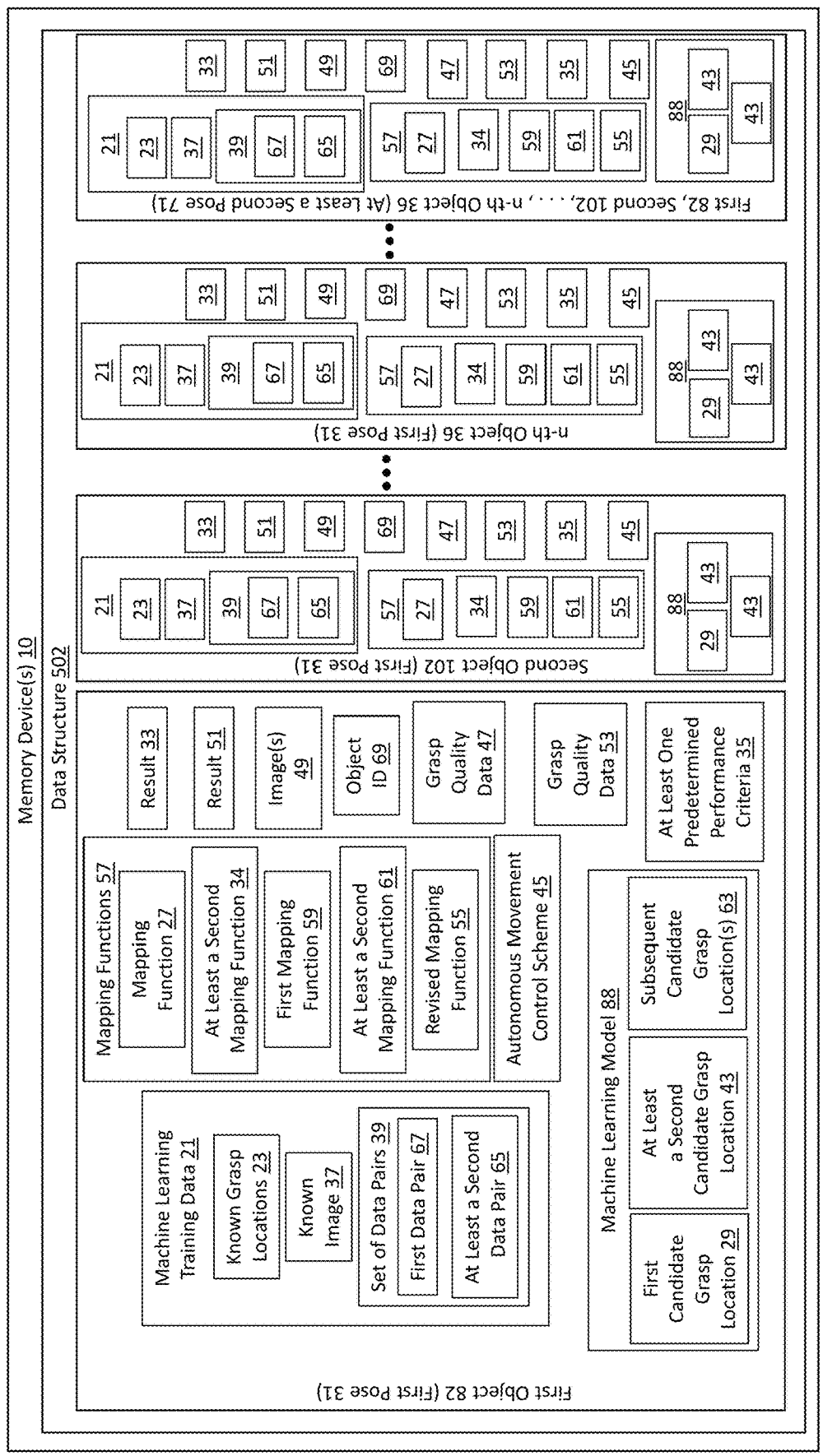
FIG. 4 is a block diagram of a data structure of the memory shown in the system of FIG. 1 according to an embodiment of the disclosure.
Figure 5:
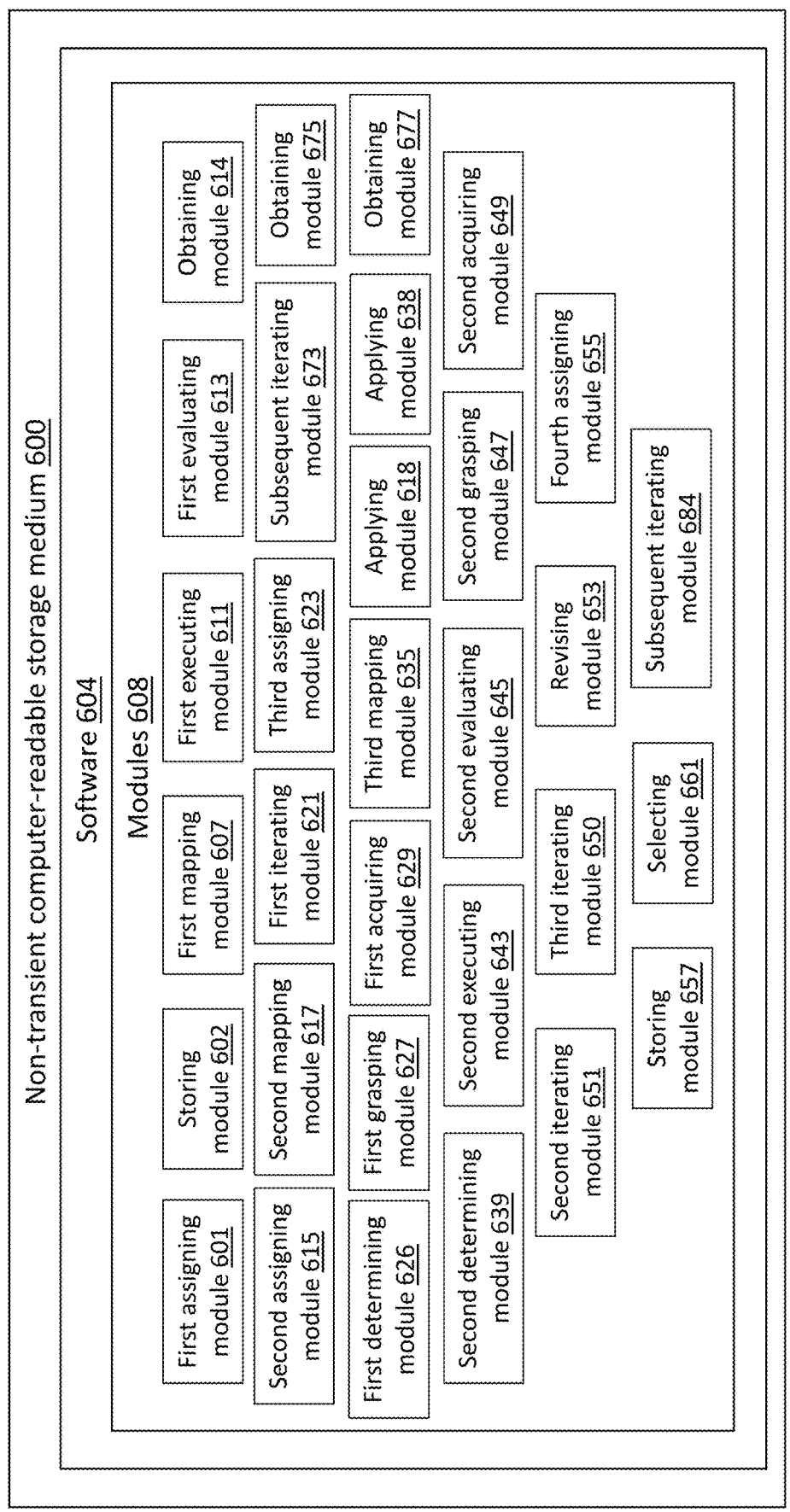
FIG. 5 is a block diagram of a software architecture for the method shown in FIG. 2 according to an embodiment of the disclosure.
Figure 6:
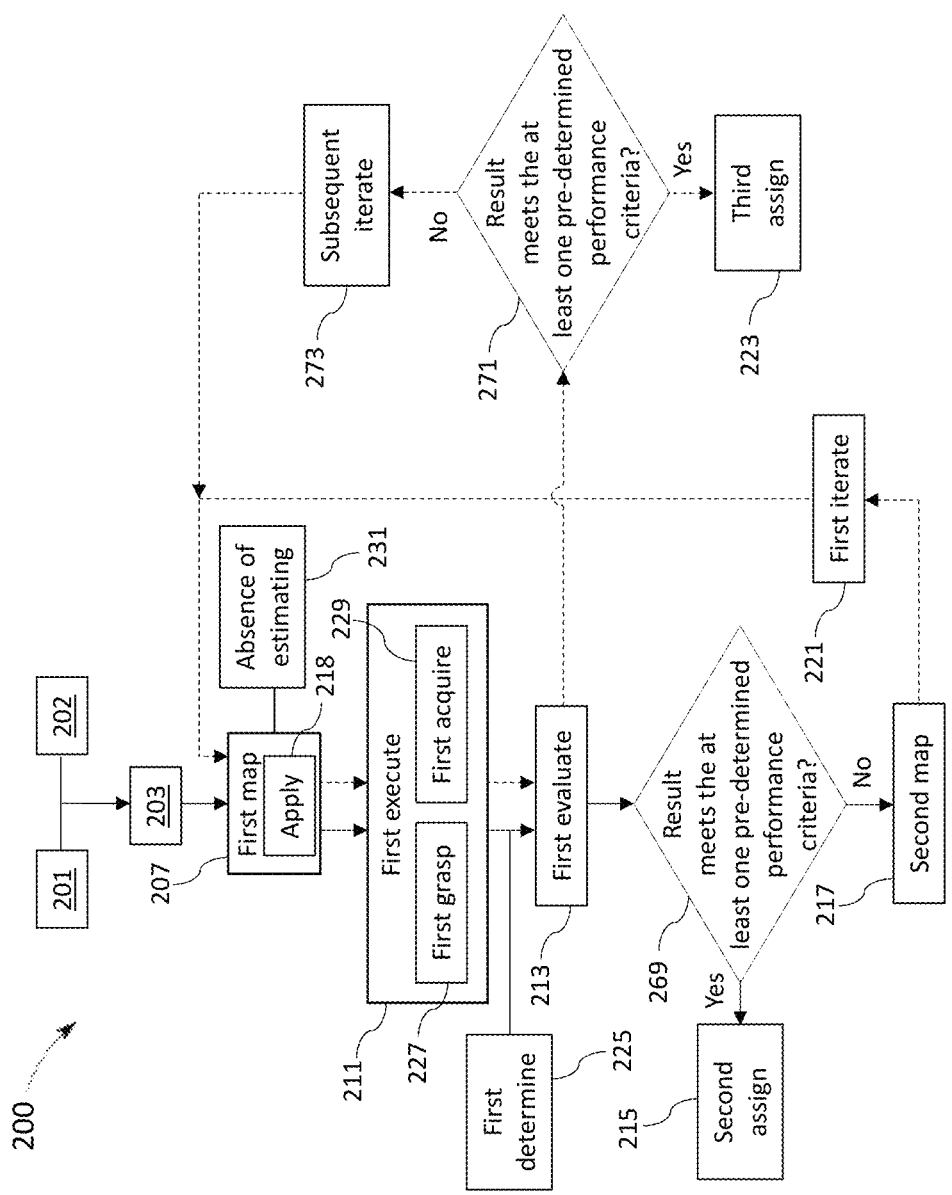
FIGS. 6-9 are flow charts of aspects of the method shown in FIG. 2 according to embodiments of the disclosure.
Figure 7:
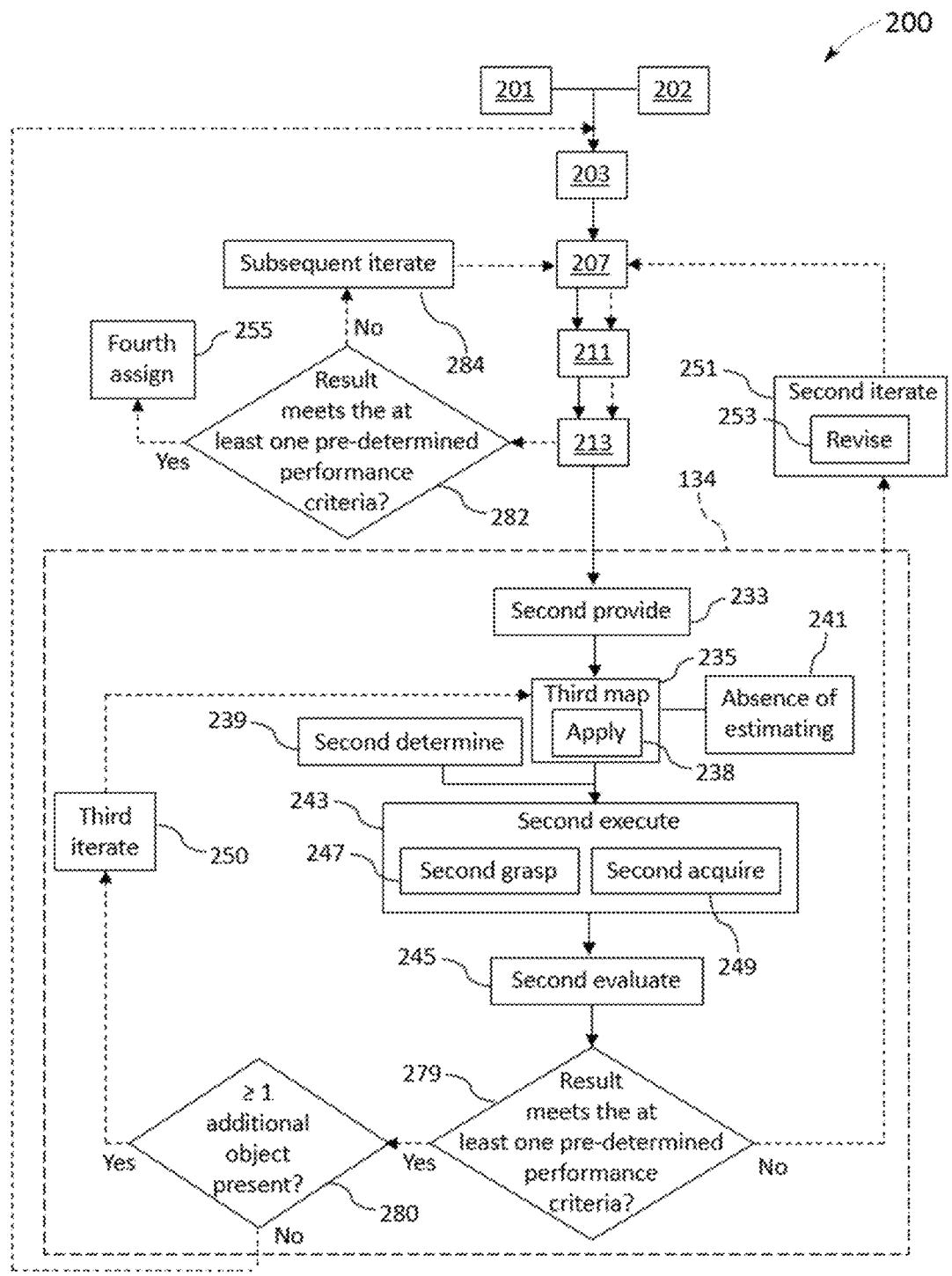
Figure 8:
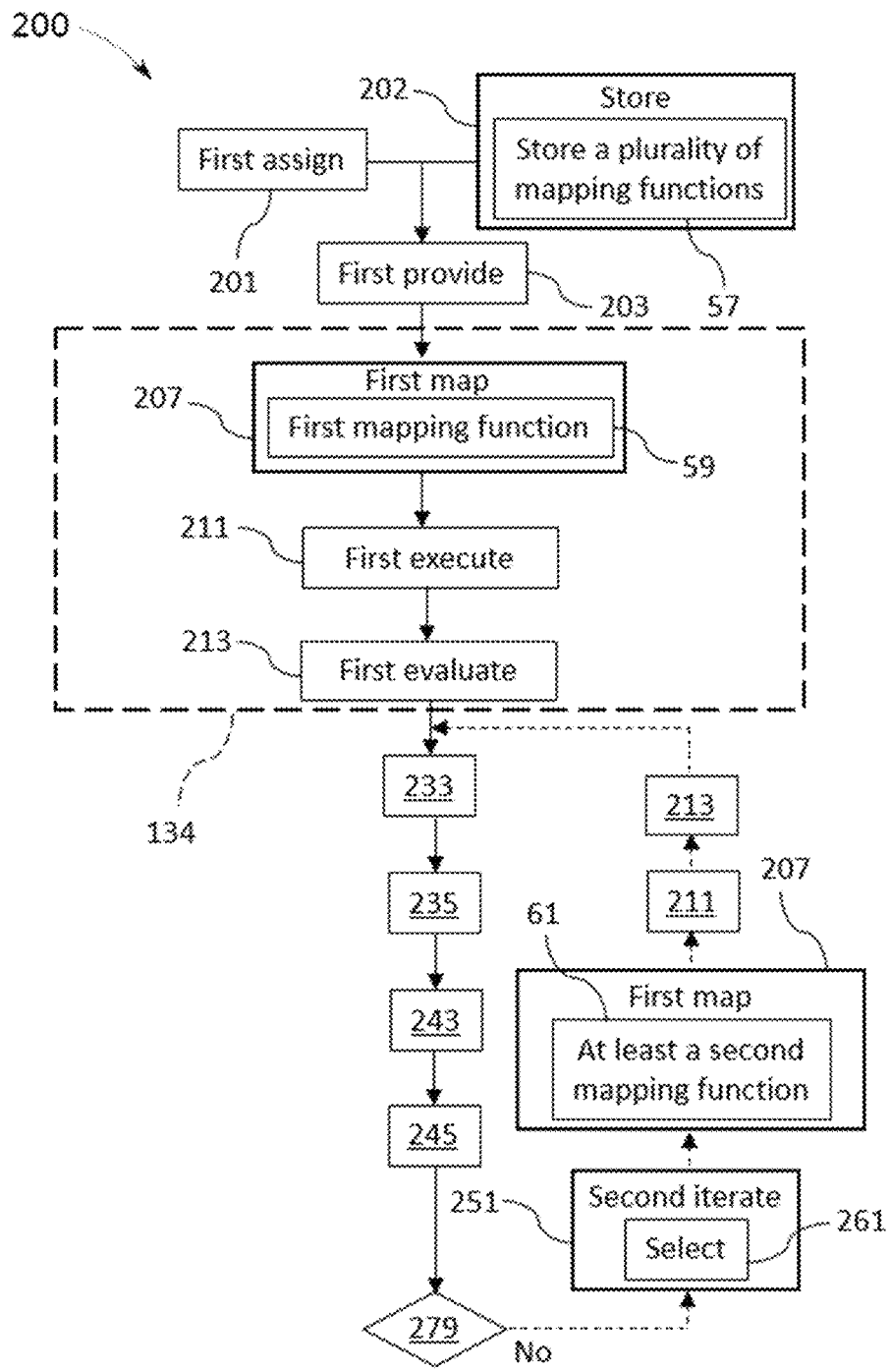
Figure 9:
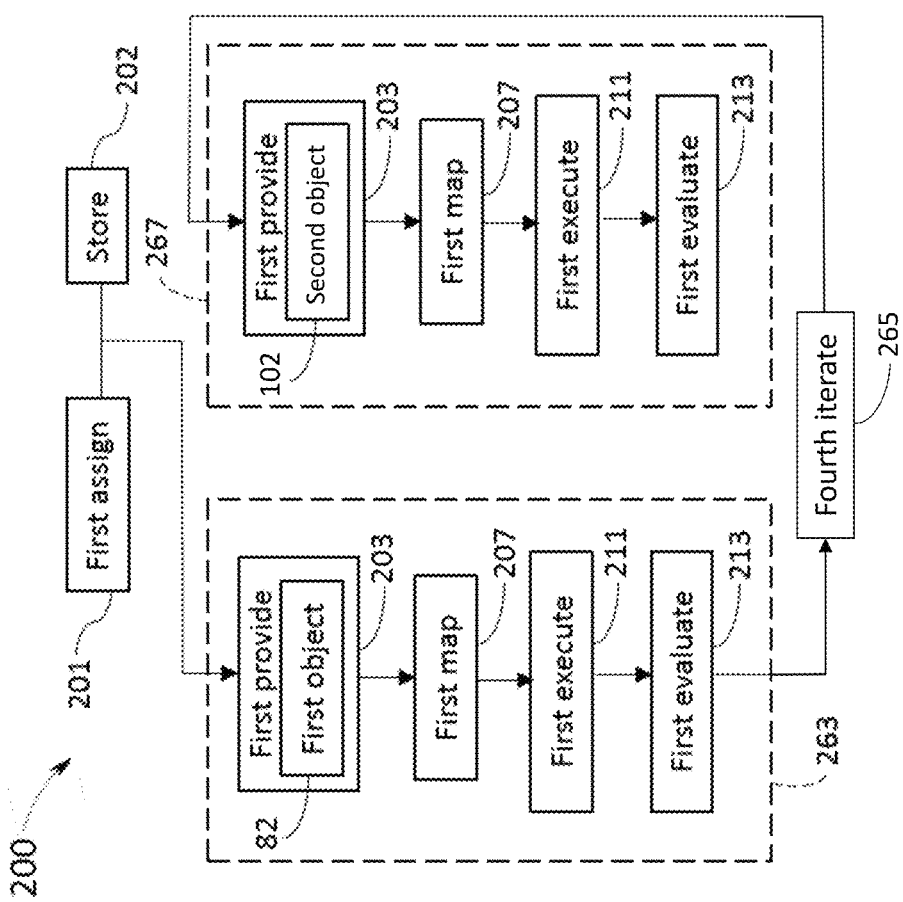

FIG. 3 is a schematic diagram of aspects of the method shown in FIG. 2 in an abbreviated representation according to an embodiment of the disclosure. FIG. 4 is a block diagram of a data structure (502) of the memory (10) shown in the system (1) of FIG. 1 according to an embodiment of the disclosure. FIG. 5 is a block diagram of a software architecture for the method (200) for the method shown in FIG. 2 according to an embodiment of the disclosure. Referring to FIGS. 1-5, method (200) includes first assigning (201) and storing (202), by processor(s) (8) and in memory (10), respectively, machine learning training data (21) of the machine learning model (88) for object (36), wherein the machine learning training data (21) includes a plurality of known grasp location labels (23) assigned to the object (36) positioned in a plurality of different object poses.

The machine learning training data (21) includes a plurality of known grasp location labels (23) assigned to the object (36) positioned in a plurality of different object poses. In an example, the known grasp location labels (23) of the object (36) are first assigned (201) and/or stored (202) by, or at the direction of, at least one user (28) of system (1). In another example, the known grasp location labels (23) of the object (36) are first assigned (201) and/or stored (202) by, or at the direction of, at least one administrator (30) of system (1). In yet another example, the known grasp location labels (23) of the object (36) are first assigned (201) and/or stored (202) by, or at the direction of, processor(s) (8). In embodiments for which the first assigning (201) and/or storing (202) step(s) is/are implemented and/or otherwise facilitated by software (604), processor(s) (8) execute processor (8)-executable instructions stored in first assigning (601) and/or storing (602) module(s). In an example, the plurality of known grasp location labels (23) are stored (202) in, and read from, data structure (502) and/or elsewhere in memory (10) by, or at the direction of, processor(s) (8).

Method (200) includes first providing (203) the object (36) in the work space (48) of the robot system (2). For the object (36) in the work space (48) in a first pose of the plurality of different object poses, method (200) includes first mapping (207), by processor(s) (8), a first candidate grasp location (29) on the object (36). In embodiments for which the first mapping (207) step is implemented and/or otherwise facilitated by software (604), processor(s) (8) execute processor (8)-executable instructions stored in a first mapping module (607). In an example, the first mapped (207) candidate grasp location (29) on the object (36) is stored in, and read from, data structure (502) and/or elsewhere in memory (10) by, or at the direction of, processor(s) (8). For the object (36) in the work space (48) in a first pose of the plurality of different object poses, method (200) includes first executing (211), by the robotic arm (16) and the gripper (20), robotic movements for the first candidate grasp location (29) on the object (36). In embodiments for which the first executing (211) step is implemented and/or otherwise facilitated by software (604), processor(s) (8) execute processor (8)-executable instructions stored in a first executing module (611).

For the object (36) in the work space (48) in a first pose of the plurality of different object poses, method (200) includes first evaluating (213), by processor(s) (8), a result (33) of the first executing (211) for the first candidate grasp location (29). In the embodiment, the result (33) of the first executing (211) step is first evaluated (213) according to at least one predetermined performance criteria (35). In embodiments for which the first evaluating (213) step is implemented and/or otherwise facilitated by software (604), processor(s) (8) execute processor (8)-executable instructions stored in a first evaluating module (613). In an example, the at least one predetermined performance criteria (35) and/or result (33) is/are stored in, and read from, data structure (502) and/or elsewhere in memory (10) by, or at the direction of, processor(s) (8). In an example, the at least one predetermined performance criteria (35) is predetermined by user(s) (28). In another example, the at least one predetermined performance criteria (35) is predetermined by administrator(s) (30). In yet another example, the at least one predetermined performance criteria (35) is predetermined by processor(s) (8).

In an embodiment, the plurality of known grasp location labels (23) may be first assigned (201) to each of a plurality of known images (37) of the object (36) stored in memory (10). In the embodiment, the machine learning training data

(21) may be stored in memory (10) as a set of data pairs (39). Each data pair (39) of the set of data pairs (39) may correspond to one of the plurality of known grasp location labels (23) first assigned (201) to one of the plurality of known images (37) of the object (36). In the embodiment, the first mapping (207) may include first mapping the first candidate grasp location (29) on the object (36) based on: one or more images (49) of the object (36) positioned in the work space (48) in the first pose obtained (214) by processor(s) (8), and a first data pair (67) of the set of data pairs (39). In embodiments for which the obtaining (214) step is implemented and/or otherwise facilitated by software (604), processor(s) (8) may execute processor (8)-executable instructions stored in an obtaining module (614). In an example, the plurality of known images (37) of the object (36) and/or the set of data pairs (39) may be stored in, and read from, data structure (502) and/or elsewhere in memory (10) by, or at the direction of, processor(s) (8).

FIGS. 6-9 are flow charts of aspects of the method (200) for controlling object (36) picking and placement by robot system (2) according to embodiments of the disclosure. Referring to FIGS. 1-6, in an embodiment, the first mapping (207) step of method (200) may be performed in the absence of estimating (231), by processor(s) (8), the first pose of the object (36) in the work space (48). In this case, such mapping is object (36) location- and object (36) orientation-invariant. Therefore, there is no need to estimate the object (36) pose in the work space (48), which provides significant improvements in efficiency as compared to known systems, methods, and software for controlling object picking and placement by robot systems. In an embodiment, the first mapping (207) step of method (200) may include applying (218), by processor(s) (8), a mapping function (27) of the machine learning model (88) to the object (36) in the work space (48) in the first pose, as shown in FIG. 3. Object pose estimation can be considered as an intermediate step for the robotic system to first localize the object, then find the grasp points based on the relative location on the object. The systems, methods, and software for controlling object picking and placement by robot systems disclosed herein skip this intermediate step. In the disclosed embodiments, the robotic system (e.g., system (1)) can find the grasp points on object (36) without knowing the object (36) position and the relative location from the grasp points and the object (36). This mapping can be done using machine learning/deep learning models. Where the input is just images, and the output is the grasp location.

In the embodiment, method (200) may include second assigning (215), by processor(s) (8), the mapping function (27) to the machine learning model (88) for the first candidate grasp location (29) on the object (36) in the first pose in the work space (48) of the robot system (2). The second assigning (215) step may be performed in method (200) in response to (e.g., as determined by a first logical test (269) implemented by processor(s) (8)) the result (33) of the first executing (211) step meeting the at least one predetermined performance criteria (35). In embodiments for which the applying (218) and/or second assigning (215) step(s) is/are implemented and/or otherwise facilitated by software (604), processor(s) (8) may execute processor (8)-executable instructions stored in applying (618) and/or second assigning (615) module(s). In an example, the mapping function (27) may be stored in, and read from, data structure (502) and/or elsewhere in memory (10) by, or at the direction of, processor(s) (8).

In an embodiment, method (200) may second mapping (217), by processor(s) (8), at least a second candidate grasp location (43) on the object (36) in the work space (48) in the first pose. The at least a second candidate grasp location (43) is different from the first candidate grasp location (29). In the embodiment, method (200) may include first iterating (221), by the processor (8) and for at least one iteration, through the first mapping (207), first executing (211), and first evaluating (213) steps for the at least a second candidate grasp location (43) on the object (36). The second mapping (217) and first iterating (221) steps may be performed in method (200) in response to (e.g., as determined by first logical test (269)) the result (33) of the first executing (211) step not meeting the at least one predetermined performance criteria (35). In embodiments for which the second mapping (217) and/or first iterating (221) step(s) is/are implemented and/or otherwise facilitated by software (604), processor(s) (8) may execute processor (8)-executable instructions stored in second mapping (617) and/or first iterating (621) module(s). In an example, the at least a second candidate grasp location (43) on the object (36) may be stored in, and read from, data structure (502) and/or elsewhere in memory (10) by, or at the direction of, processor(s) (8).

In the embodiment, for the first iterating (221) step, method (200) may include includes third assigning (223), by processor(s) (8), at least a second mapping function (29) to the machine learning model (88) for the at least a second candidate grasp location (43) on the object (36) in the first pose in the work space (48) of the robot system (2). The third assigning (223) step is performed in method (200) if the result (33) of the first executing (211) step (e.g., as determined by a second logical test (271) implemented by processor(s) (8)) meets the at least one predetermined performance criteria (35). In embodiments for which the third assigning (223) step is implemented and/or otherwise facilitated by software (604), processor(s) (8) may execute processor (8)-executable instructions stored in a third assigning module (623). In an example, the at least a second mapping function (29) may be stored in, and read from, data structure (502) and/or elsewhere in memory (10) by, or at the direction of, processor(s) (8).

In the embodiment, for the first iterating (221) step, if the result (33) of the first executing (211) step (e.g., as determined by the second logical test (271)) does not meet the at least one predetermined performance criteria (35), then method (200) includes subsequent iterating (273), by processor(s) (8) and for at least one subsequent iteration, through the first mapping (207), first executing (211), and first evaluating (213) steps for at least one subsequent candidate grasp location (63) on the object (36) (e.g., different from the first and the at least a second candidate grasp locations). In this case, for the first iterating (221), the subsequent iterating (273) step is performed in method (200) instead of the third assigning (223) step. In embodiments for which the subsequent iterating (273) step is implemented and/or otherwise facilitated by software (604), processor(s) (8) may execute processor (8)-executable instructions stored in a subsequent iterating module (673).

In an embodiment, the set of data pairs (39) may include a first data pair (67) and at least a second data pair (65). In the embodiment, the second mapping (217) step of method (200) may include second mapping the at least a second candidate grasp location (43) on the object (36). The at least a second candidate grasp location (43) may be second mapped (217) on the object based on: one or images (49) of the object (36) positioned in the work space (48) in the first pose obtained (275) by processor(s) (8), and the at least a second data pair (65). In embodiments for which the obtaining (275) step is implemented and/or otherwise facilitated by software (604), processor(s) (8) may execute processor (8)-executable instructions stored in an obtaining module (675). In an example, the one or more images (49) obtained (275) by processor(s) (8) may be stored in, and read from, data structure (502) and/or elsewhere in memory (10) by, or at the direction of, processor(s) (8).

In an embodiment, method (200) may include first determining (225), by processor(s) (8), an autonomous movement control scheme (45). In the embodiment, the autonomous movement control scheme (45) may be first determined (225) based on a position of the first candidate grasp location (29) on the object (36) in the work space (48). In embodiments for which the first determining (225) step is implemented and/or otherwise facilitated by software (604), processor(s) (8) may execute processor (8)-executable instructions stored in a first determining module (626). In an example, the first determined (225) autonomous movement control scheme (45) may be stored in, and read from, data structure (502) and/or elsewhere in memory (10) by, or at the direction of, processor(s) (8).

In an embodiment, the first executing (211) step of method (200) may include first grasping (227), by the robotic arm (16) and the gripper (20), the object (36). In the embodiment, the first executing (211) step may include first acquiring (229), by processor(s) (8) and from the one or more sensors (24), grasp quality data (47) for the first grasping (227) step. In an example, the first evaluating (213) of the method (200) may include first evaluating a first grasp quality of the robotic arm (16) and/or the gripper (20). In the embodiment, the first grasp quality for the object (36) may be first evaluated (213) based on the first acquired (229) grasp quality data (47). In embodiments for which the first grasping (227) and/or first acquiring (229) step(s) is/are implemented and/or otherwise facilitated by software (604), processor(s) (8) may execute processor (8)-executable instructions stored in first grasping (627) and/or first acquiring (629) module(s). In an example, the first acquired (229) grasp quality data (47) may be stored in, and read from, data structure (502) and/or elsewhere in memory (10) by, or at the direction of, processor(s) (8).

Referring to FIGS. 1-7, in an embodiment, method (200) may include second providing (233) the object (36) in the run time work space (134). In the embodiment, method (200) may include third mapping (235), by processor(s) (8), the first candidate grasp location (29) on the object (36) in the run time work space (134) in the first pose. The third mapping (235) step may include applying (238), by processor(s) (8), mapping function (27) of the machine learning model (88) to the object (36) in the run time work space (134) in the first pose. In the embodiment, the third mapping (235) step of method (200) may be performed in the absence of estimating (241), by processor(s) (8), the first pose of the object (36) in the run time work space (134). In this case, such mapping is object (36) location- and object (36) orientation-invariant. Therefore, there is no need to estimate the object (36) pose in the run time work space (134), which provides significant improvements in efficiency as compared to known systems, methods, and software for controlling object picking and placement by robot systems. In embodiments for which the third mapping (235) and/or applying (238) step(s) is/are implemented and/or otherwise facilitated by software (604), processor(s) (8) may execute processor (8)-executable instructions stored in third mapping (635) and/or applying (638) module(s). In an example, the applied (238) mapping function (27) may be stored in, and read from, data structure (502) and/or elsewhere in memory (10) by, or at the direction of, processor(s) (8).

In the embodiment, the third mapping (235) step of method (200) may include third mapping (235) the first candidate grasp location (29) on the object (36) based on: one or more images (49) of the object (36) positioned in the run time work space (134) in the first pose obtained (277) by the processor (8), and a first data pair (67) of the set of data pairs (39). In embodiments for which the obtaining (277) step is implemented and/or otherwise facilitated by software (604), processor(s) (8) may execute processor (8)-executable instructions stored in an obtaining module (677). In an example, the one or more images (49) obtained (277) by processor(s) (8) may be stored in, and read from, data structure (502) and/or elsewhere in memory (10) by, or at the direction of, processor(s) (8).

In the embodiment, method (200) may include second determining (239), by processor(s) (8), an autonomous movement control scheme (45). The autonomous movement control scheme (45) may be second determined (239) based on a position of the first candidate grasp location (29) on the object (36) in the run time work space (134). In embodiments for which the second determining (239) step is implemented and/or otherwise facilitated by software (604), processor(s) (8) may execute processor (8)-executable instructions stored in a second determining module (639). In an example, the second determined (239) autonomous movement control scheme (45) may be stored in, and read from, data structure (502) and/or elsewhere in memory (10) by, or at the direction of, processor(s) (8).

Method (200) may include second executing (243), by the robotic arm (16) and the gripper (20), the second determined (239) autonomous movement control scheme (45) for the first candidate grasp location (29) on the object (36) in the run time work space (134). In embodiments for which the second executing (243) step is implemented and/or otherwise facilitated by software (604), processor(s) (8) execute processor (8)-executable instructions stored in a second executing module (643). Method (200) may include second evaluating (245), by processor(s) (8), a result (51) of the second executing (243) for the first candidate grasp location (29). In the embodiment, the result (51) of the second executing (243) step is second evaluated (245) according to the at least one predetermined performance criteria (35). In embodiments for which the second evaluating (245) step is implemented and/or otherwise facilitated by software (604), processor(s) (8) execute processor (8)-executable instructions stored in a second evaluating module (645). In an example, the result (51) is stored in, and read from, data structure (502) and/or elsewhere in memory (10) by, or at the direction of, processor(s) (8).

In an embodiment, the second executing (243) step of method (200) may include second grasping (247), by the robotic arm (16) and the gripper (20), the object (36). In the embodiment, the second executing (243) step may include second acquiring (249), by processor(s) (8) and from the one or more sensors (24), grasp quality data (53) for the second grasping (247) step. In an example, the second evaluating (245) step of method (200) may include second evaluating a second grasp quality of the robotic arm (16) and/or the gripper (20). In the embodiment, the second grasp quality for the object (36) may be second evaluated (245) based on the second acquired (249) grasp quality data (53). In embodiments for which the second grasping (247) and/or second acquiring (249) step(s) is/are implemented and/or otherwise facilitated by software (604), processor(s) (8) may execute processor (8)-executable instructions stored in second grasping (647) and/or second acquiring (649) module(s). In an example, the second acquired (249) grasp quality data (53) may be stored in, and read from, data structure (502) and/or elsewhere in memory (10) by, or at the direction of, processor(s) (8).

In an embodiment, method (200) may include second iterating (251), by processor(s) (8) and for at least one iteration, through the first mapping (207), first executing (211), and first evaluating (213) steps. In an example, the second iterating (251) step is performed in method (200) in response to (e.g., as determined by a third logical test (279) implemented by processor(s) (8)) the result (51) of the second executing (243) step not meeting the at least one predetermined performance criteria (35). In embodiments for which the second iterating (251) step is implemented and/or otherwise facilitated by software (604), processor(s) (8) may execute processor (8)-executable instructions stored in a second iterating module (651).

If the result (51) of the second executing (243) step meets the at least one predetermined performance criteria (35) (e.g., as determined by the third logical test (279)), method (200) may proceed to a third iterating (250) step instead of performing the second iterating (251) step. In this case, method (200) third iterates (250), for at least one iteration, through the third mapping (235), second executing (243), and second evaluating (245) steps. In an example, the third iterating (250) step is performed in method (200) in response to (e.g., as determined by a fourth logical test (280)), a presence of at least one additional object (36) for picking and placement by robotic arm (16) and gripper (20) in the run time work space (134). In embodiments for which the third iterating (250) step is implemented and/or otherwise facilitated by software (604), processor(s) (8) may execute processor (8)-executable instructions stored in a third iterating module (650).

For the case of the result (51) not meeting the at least one predetermined performance criteria (35), the second iterating (251) step may include revising (253), by processor(s) (8), the mapping function (27). In an example, the first mapping (207) step of method (200) may include first mapping the first candidate grasp location (29) on the object (36) using a revised (253) mapping function (55) (e.g., resulting from the revising (253) step). In embodiments for which the revising (253) step is implemented and/or otherwise facilitated by software (604), processor(s) (8) may execute processor (8)-executable instructions stored in a revising module (653). In an example, the revised (253) mapping function (55) may be stored in, and read from, data structure (502) and/or elsewhere in memory (10) by, or at the direction of, processor(s) (8).

In an embodiment, if, for the second iterating (251), the result (33) of the first executing (211) meets the at least one predetermined performance criteria (35) (e.g., as determined by a fifth logical test (282) implemented by processor(s) (8)), method (200) performs a fourth assigning (255) step. In an example, the revised (253) mapping function (55) is fourth assigned (255), by processor(s) (8) to the machine learning model (88) for the first candidate grasp location (29) on object (36) in the first pose in the work space (48) of robot system (2). In embodiments for which the fourth assigning (255) step is implemented and/or otherwise facilitated by software (604), processor(s) (8) may execute processor (8)-executable instructions stored in a fourth assigning module (655).

If, for the second iterating (251), the result (33) of the first executing (211) does not meet the at least one predetermined performance criteria (35) (e.g., as determined by fifth logical test (282)), method (200) may proceed to a subsequent iterating (284) step instead of performing the fourth assigning (255) step. In this case, method (200) subsequent iterates (284), by processor(s) (8), for at least one iteration, through the first mapping (207), first executing (211), and first evaluating (213) steps for at least one subsequent candidate grasp location (63) on object (36) (e.g., different from the first (29) and the at least a second (43) candidate grasp location). In embodiments for which the subsequent iterating (284) step is implemented and/or otherwise facilitated by software (604), processor(s) (8) may execute processor (8)-executable instructions stored in a subsequent iterating module (684). In an example, the subsequent candidate grasp location(s) (63) on object (36) may be stored in, and read from, data structure (502) and/or elsewhere in memory (10) by, or at the direction of, processor(s) (8).

Referring to FIGS. 1-8, in an embodiment, the mapping function (27) may include a plurality of mapping functions (57). In the embodiment, method (200) may include storing (257), by processor(s) (8), the plurality of mapping functions (57) in memory (10). In an example, the plurality of mapping functions (57) includes a first mapping function (59) used (e.g., by processor(s) (8)) for a first performance (259) of the first mapping (207), first executing (211), and first evaluating (213) steps for the first candidate grasp location (29) on object (36) in the first pose in the work space (48).

In the embodiment, the second iterating (251) step map include selecting (261), by processor(s) (8), at least a second mapping function (61) of the plurality of mapping functions (57). The second mapping function(s) (61) is/are different from the first mapping function (59). For the second iterating (251), the first mapping (207) step of method (200) including first mapping the first candidate grasp location (29) on object (36) using the at least a second mapping function (61). In embodiments for which the storing (257) and/or selecting (261) step(s) is/are implemented and/or otherwise facilitated by software (604), processor(s) (8) may execute processor (8)-executable instructions stored in storing (657) and/or selecting (661) module(s). In an example, the plurality of mapping locations (57) including the first (59) and the at least a second (61) mapping functions may be stored (257) in, and read from, data structure (502) and/or elsewhere in memory (10) by, or at the direction of, processor(s) (8).

Referring to FIGS. 1-9, in an embodiment, a plurality of objects (36) (e.g., a first (82) and at least a second (102) object) may be present in the work space (48) of the robot system (2). The second object (102) is different from the first object (82). In an example, the first object (82) is used in a first performance (263) of the method (200). In the embodiment, for the second object(s) (102), method (200) may include fourth iterating (265), by processor(s) (8) and for at least one iteration, at least a second performance (267) of the method (200).

It will be appreciated that the systems and method disclosed herein are scalable, flexible, and applicable to any number of like and/or dissimilar objects (36). Similarly, the above-described systems and methods are equally applicable for objects present in work space (48) in both the first pose and any number of additional object poses different from the first pose.

Figure 10:
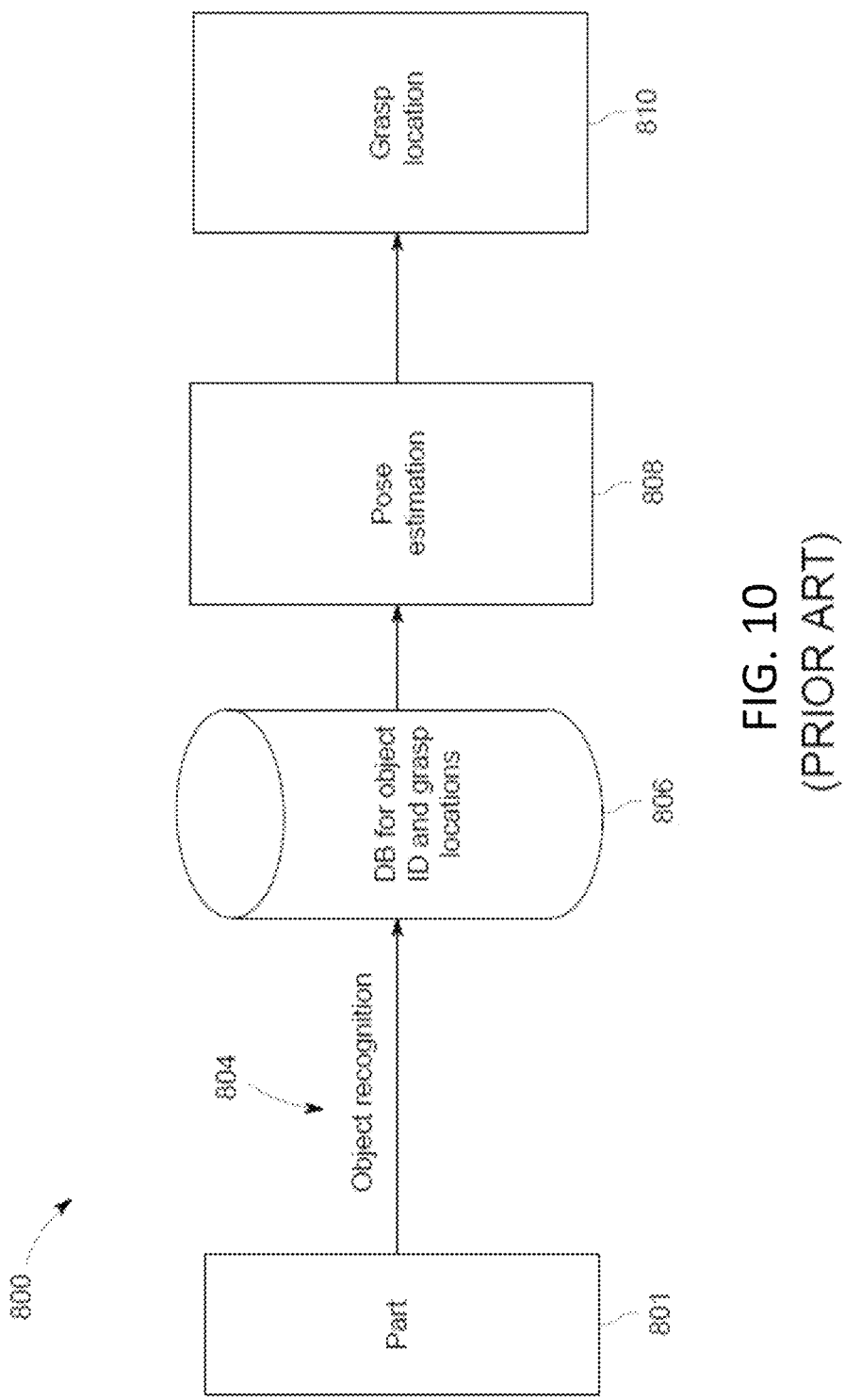
FIG. 10 is a schematic diagram of a known process for object picking and placing using a known robotic system.
Figure 11:
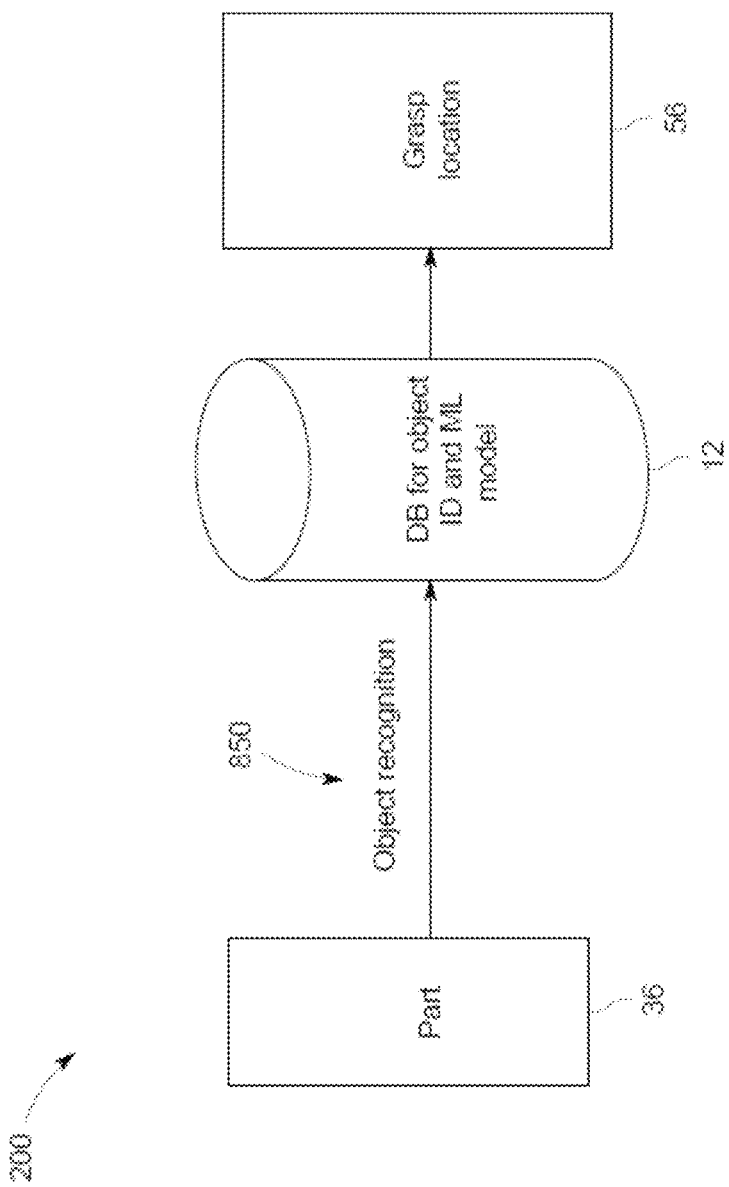
FIG. 11 is a schematic diagram of the method shown in FIG. 2 in an abbreviated representation.

Referring to FIGS. 10 and 11, the disclosed systems and methods for machine learning-based grasping of objects by robotic system(s) provide numerous technical benefits and beneficial effects as compared to known systems and methods. FIG. 10 is a schematic diagram of a known process (800) for picking and placement of objects (e.g., part (801)) using a known robotic system. In known process (800), sensor(s) such as one or more cameras acquire image(s) of part(s) (801) for object recognition (804) purposes. In known process (800), the image(s) acquired during for object recognition (804) are compared against image(s) of the part(s) (801) stored in a database (806) and additional processing is performed to determine the object ID and grasp location for the part(s) (801). Next, in known process (800), pose estimation (808) is performed on the part(s) (801) based on the image(s) acquired for object recognition (804) purposes. The known process (800) determines to grasp location (810) for a robotic arm with object gripper device to use for picking up the part(s) (801). The known process (800) then utilizes a robotic arm with an object gripper device for picking and placing the part(s) (801) based on the determined grasp location (810).

FIG. 11 is a schematic diagram of method (200) shown in FIG. 2 in an abbreviated representation. In method (200), sensor(s) (e.g., sensor(s) (24)) such as one or more cameras acquire image(s) of part(s) (e.g., object(s) (36)) for object recognition (850) purposes, according to the systems and method shown and described above with reference to FIGS. 1-9 and 11. In method (200), the image(s) (e.g., images (49)) acquired for object recognition (850) are compared and otherwise analyzed by processor(s) (8) against image(s) (e.g., known images (37)) of the object(s) (36) stored in database (12) and/or elsewhere in memory (10). Additional processing is performed by processor(s) (8) to determine the object ID (40) of object(s) (36) and grasp location (e.g., candidate grasp location(s) (56)) for the objects(s) (36), including based on the machine learning (ML) model (88) stored, compiled, and/or updated in database (12) and/or elsewhere in memory (10). The disclosed method (200) then determines the candidate grasp location(s) (56) for robotic arm(s) (16) with gripper(s) (20) to use for picking up the object(s) (36). In method (200), processor(s) (8) then command and/or otherwise facilitate execution of the determined autonomous movement control scheme (e.g., control scheme (64)) by robotic arm(s) (16) with gripper(s) (20) for picking and placing the object(s) (36) based on the determined candidate grasp location(s) (56).

Comparing the known process (800) shown in FIG. 10 to the disclosed method (200) shown in FIG. 11 in abbreviated form, using the disclosed systems and methods for machine learning-based grasping of objects by robotic system(s) enable picking and placing of object(s) in the absence of pose estimation (808), and with the same or better accuracy, speed, efficiency, and error rate as compared to known processes (e.g., process (800)). Utilizing the disclosed systems and methods for methods for machine learning-based grasping of objects by robotic system(s) thereby results in a reduction in the required number of per object CPU clock cycles needed for processor(s) (8), as compared to known systems and methods. As such, the disclosed systems and methods for machine learning-based grasping of objects by robotic system(s) enable picking and placing of object(s) with improved utilization of computing, memory, network, electric power, and/or human personnel resources as compared to known processes (e.g., process (800)).

The above-described machine learning-based systems, methods, and software for controlling object picking and placement by robot systems provide users a number of beneficial technical effects and realize various advantages as compared to known systems and methods. Such benefits include, without limitation, enabling picking and placing of object(s) in the absence of pose estimation, and with the same or better accuracy, speed, efficiency, and error rate as compared to known processes. Utilizing the disclosed systems and methods for controlling object picking and placement by robot systems thereby results in a reduction in the required number of per object CPU clock cycles needed for processor(s), as compared to known systems and methods. As such, the disclosed systems and methods for controlling object picking and placement by robot systems enable picking and placing of object(s) with improved utilization of computing, memory, network, electric power, and/or human personnel resources as compared to known processes. These and other substantial and numerous technical benefits and advantageous effects appreciable to persons of ordinary skill in the art are especially evident as compared to known systems and methods in applications involving high volume and high tempo industrial operations.

For practical applications including controlling object picking and placement by robot systems, these improvements over known systems and methods are not accomplished by merely utilizing conventional and routine processing systems and methods. Even in cases where such improvements may be quantified in terms of per object time reductions (e.g., measured as seconds, or fractions thereof), over relevant time periods (e.g., from hours to years) and as compared to known systems and methods, the disclosed machine learning-based systems, methods, and software for controlling object picking and placement by robot systems utilize computing, network, memory, electric power, personnel, among other, resources at significantly greater efficiencies to provide improved throughput of, and overall cost reduction for, a variety of industrial unit operations involving robotic picking and placement of objects.

Various embodiments disclosed herein are to be taken in the illustrative and explanatory sense, and should in no way be construed as limiting of the present disclosure.

While aspects of the present disclosure have been particularly shown and described with reference to the embodiments above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof.

We claim:

1. A method for controlling object picking and placement by a robot system, the robot system including: a processor in communication with a memory device, a robotic arm in communication with the processor, and an object gripper device operably coupled to the robotic arm and in communication with the processor, the method comprising:
    (a) assigning and storing in the memory device, by the processor, machine learning training data of a machine learning model for an object, wherein the machine learning training data includes a plurality of known grasp location labels assigned to the object positioned in a plurality of different object poses;
    (b) providing the object in a work space of the robot system;
    (c) for the object in the work space in a first pose of the plurality of different object poses:
        (i) mapping, by the processor, a first candidate grasp location on the object;
        (ii) executing, by the robotic arm and the object gripper device, robotic movements for the first candidate grasp location on the object; and
        (iii) evaluating, by the processor, a result of the executing for the first candidate grasp location according to at least one predetermined performance criteria based on signals provided by one or more of a multi-degree of freedom force-torque sensor, a camera, a multi-degree of freedom inertial measurement sensor, a directional motion sensor, a rotational motion sensor, or a tactile sensor such that the signals include measurement of a static and/or dynamic status of the object with respect to the object gripper device and the known grasp location of the object.

2. The method of claim 1, wherein:

the plurality of known grasp location labels are assigned to each of a plurality of known images of the object stored in the memory device;

the machine learning training data are stored in the memory device as a set of data pairs, each data pair of the set of data pairs corresponding to one of the plurality of known grasp location labels assigned to one of the plurality of known images of the object; and the mapping includes mapping the first candidate grasp location on the object based on: one or more images of the object positioned in the work space in the first pose obtained by the processor, and a first data pair of the set of data pairs.

3. The method of claim 1, wherein:

the mapping includes applying, by the processor, a mapping function of the machine learning model to the object in the work space in the first pose; and said method further comprises:

in response to the result of the executing meeting the at least one predetermined performance criteria, assigning, by the processor, the mapping function to the machine learning model for the first candidate grasp location on the object in the first pose in the work space of the robot system.

4. The method of claim 1, further comprising:

(iv) in response to the result of the executing not meeting the at least one predetermined performance criteria:

(A) mapping, by the processor, at least a second candidate grasp location on the object in the work space in the first pose, wherein the at least a second candidate grasp location is different from the first candidate grasp location;

(B) iterating, by the processor and for at least one iteration, through (c)(i)-(c)(iii) for the at least a second candidate grasp location on the object; and (C) for the iterating:

if the result of the executing meets the at least one predetermined performance criteria, then assigning, by the processor, at least a second mapping function to the machine learning model for the at least a second candidate grasp location on the object in the first pose in the work space of the robot system;

else: subsequent iterating, by the processor and for at least one subsequent iteration, through (c)(i)-(c)(iii) for at least one subsequent candidate grasp location on the object.

5. The method of claim 4, wherein the set of data pairs includes a first data pair and at least a second data pair, and wherein the mapping (iv)(A) includes mapping the at least a second candidate grasp location on the object based on: one or images of the object positioned in the work space in the first pose obtained by the processor, and the at least a second data pair.

6. The method of claim 1 further comprising determining, by the processor, an autonomous movement control scheme based on a position of the first candidate grasp location on the object in the work space.

7. The method of claim 1, wherein the robot system further includes one or more sensors in communication with the processor and operably coupled to at least one of: the robotic arm and the object gripper device, and wherein the executing includes:

grasping, by the robotic arm and the object gripper device, the object; and acquiring, by the processor and from the one or more sensors, grasp quality data for the grasping.

8. The method of claim 7, wherein the evaluating includes evaluating a grasp quality of the at least one of: the robotic arm and the object gripper device, for the object based on the acquired grasp quality data.

9. The method of claim 1, wherein the mapping is performed in the absence of estimating, by the processor, the first pose of the object in the work space.

10. The method of claim 1, wherein the work space includes a run time work space of the robot system, said method further comprising:

providing the object in the run time work space; and mapping, by the processor, the first candidate grasp location on the object in the run time work space in the first pose, wherein the mapping includes applying, by the processor, a mapping function of the machine learning model to the object in the run time work space in the first pose.

11. The method of claim 10, wherein the mapping the first candidate grasp location on the object in the run time work space in the first pose is performed in the absence of estimating, by the processor, the first pose of the object in the run time work space.

12. The method of claim 1, wherein:

the object includes a plurality of objects including a first object and at least a second object different from the first object;

the first object is used in a first performance of the method; and for the at least a second object, the method further comprises iterating, by the processor and for at least one iteration, at least a second performance of the method.

13. A system for controlling object picking and placement by a robot, the system comprising:

at least one object gripper device;

at least one robotic arm operably coupled to the at least one object gripper device;

at least one memory device; and at least one processor in communication with the at least one memory device, wherein the at least one processor is programmed to:

(a) assign machine learning training data of a machine learning model for an object, wherein the machine learning training data includes a plurality of known grasp location labels assigned to the object positioned in a plurality of different object poses; and (b) for the object positioned in a work space of the robot in a first pose of the plurality of different object poses:

(i) map a first candidate grasp location on the object;

(ii) execute robotic movements by the at least one robotic arm and the at least one object gripper device for the first candidate grasp location on the object; and (iii) evaluate a result of the executing for the first candidate grasp location according to at least one predetermined performance criteria stored in the at least one memory device based on signals provided by one or more of a multi-degree of freedom force-torque sensor, a camera, a multi-degree of freedom inertial measurement sensor, a directional motion sensor, a rotational motion sensor, or a tactile sensor such that the signals include measurement of a static and/or dynamic status of the object with respect to the object gripper device and the known grasp location of the object.

14. The system of claim 13, wherein the work space includes a run time work space of the robot, and wherein the at least one processor is further programmed to:
map the first candidate grasp location on the object in the run time work space in the first pose; and
for mapping the first candidate grasp location on the object in the run time work space in the first pose, apply a mapping function of the machine learning model to the object in the run time work space in the first pose.

15. The system of claim 14, where the at least one processor is further programmed to: execute the autonomous movement control scheme for the first candidate grasp location on the object in the run time work space.

16. The system of claim 15, wherein the at least one processor is further programmed to: evaluate a result of the executing for the first candidate grasp location on the object in the run time work space according to the at least one predetermined performance criteria.

17. The system of claim 16 further comprising one or more sensors in communication with the at least one processor and operably coupled to at least one of: the at least one robotic arm, and the at least one object gripper device, wherein, for the executing, the at least one processor is further programmed to:
grasp the object; and
acquire, from the one or more sensors, grasp quality data for the grasping.

18. The system of claim 17, wherein, for the evaluating, the at least one processor is further programmed to: evaluate a grasp quality of the at least one of: the at least one robotic arm, and the at least one object gripper device, for the object based on the acquired grasp quality data.

19. The system of claim 16, wherein, if the result of the executing for the first candidate grasp location on the object in the run time work space does not meet the at least one predetermined performance criteria, the at least one processor is further programmed to iterate, for at least one iteration, through (b)(i)-(b)(iii).

20. A non-transient computer-readable medium storing as software processor-executable instructions for controlling object picking and placement by a robot system, wherein, when executed by one or more processors in communication with one or more memory devices, the processor-executable instructions cause the one or more processors to:
(a) assign machine learning training data of a machine learning model for an object, wherein the machine learning training data includes a plurality of known grasp location labels assigned to the object positioned in a plurality of different object poses;
(b) for the object positioned in a work space of the robot system in a first pose of the plurality of different object poses:
(i) map a candidate grasp location on the object;
(ii) execute robotic movements by at least one robotic arm and at least one object gripper device of the robot system for the candidate grasp location on the object; and
(iii) evaluate a result of the executing for the candidate grasp location according to at least one predetermined performance criteria based on signals provided by one or more of a multi-degree of freedom force-torque sensor, a camera, a multi-degree of freedom inertial measurement sensor, a directional motion sensor, a rotational motion sensor, or a tactile sensor such that the signals include measurement of a static and/or dynamic status of the object with respect to the object gripper device and the known grasp location of the object.

* * * * *